Dec. 27, 1966 R. P. GEHMAN ET AL 3,293,835
LIFT SYSTEM FOR THE HEADER AND CONDITIONER OF A WINDROWER
Filed May 25, 1964 3 Sheets-Sheet 1
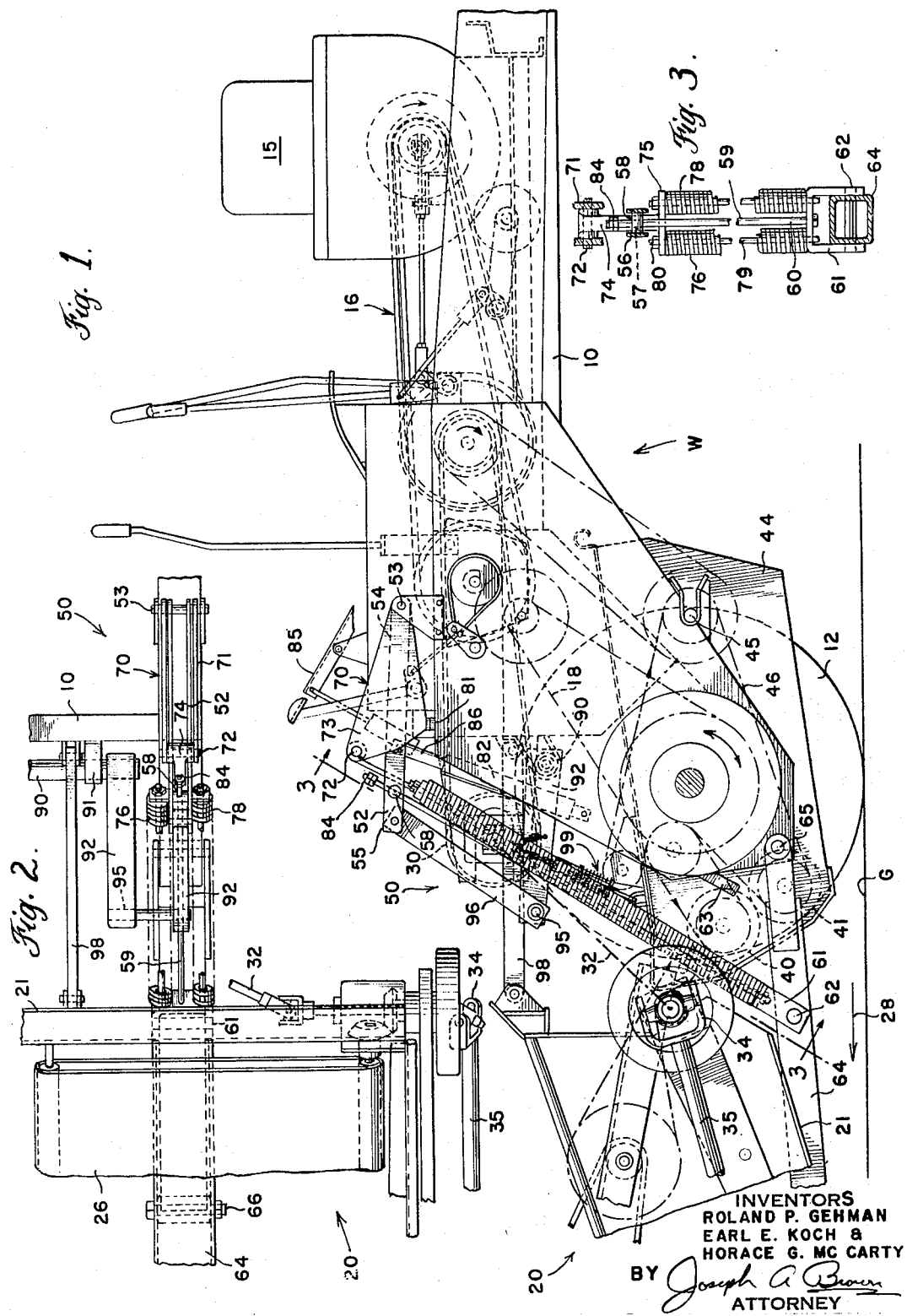
INVENTORS
ROLAND P. GEHMAN
EARL E. KOCH &
HORACE G. MC CARTY
BY Joseph A. Brown
ATTORNEY

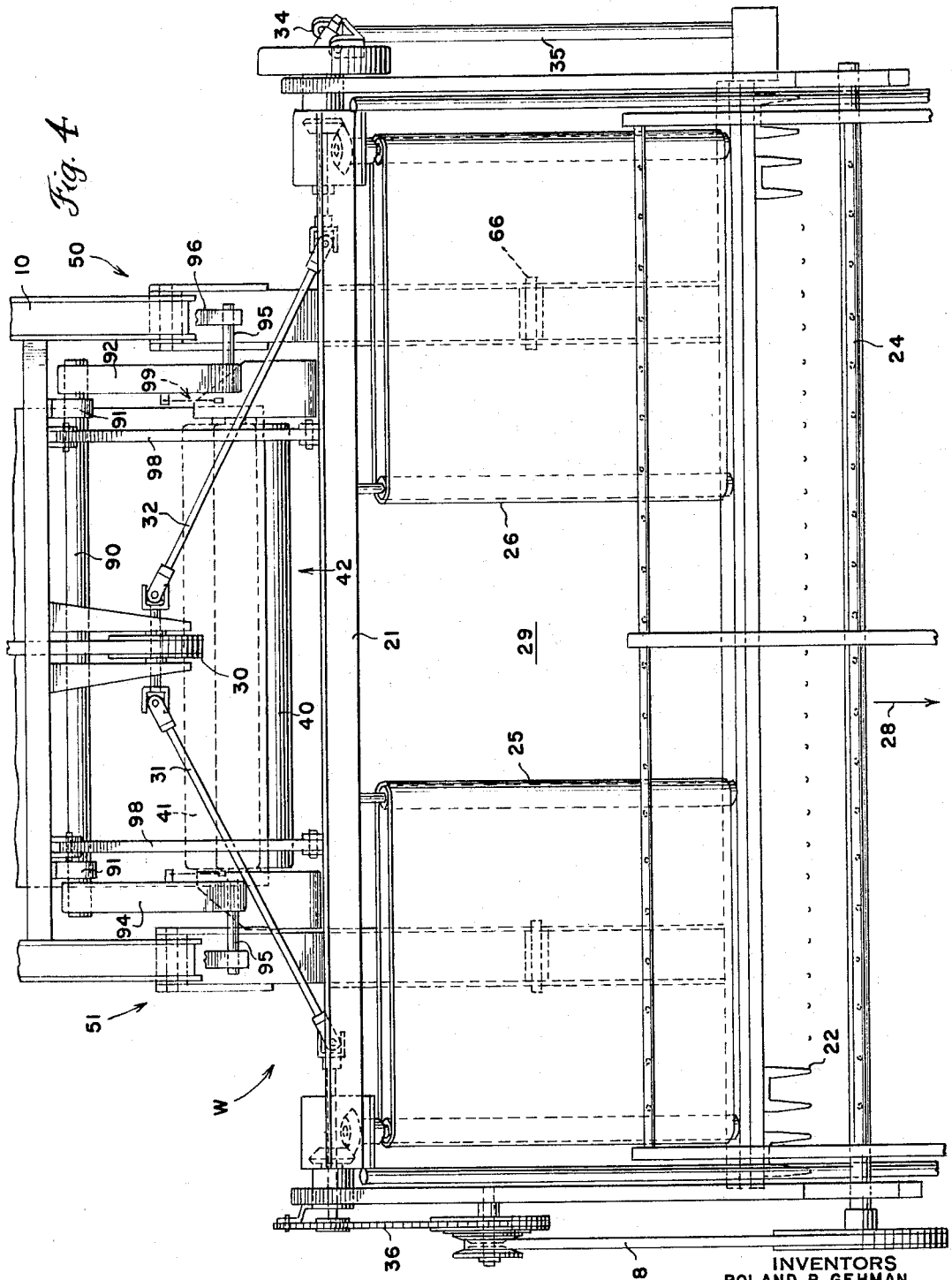

Dec. 27, 1966    R. P. GEHMAN ET AL    3,293,835
LIFT SYSTEM FOR THE HEADER AND CONDITIONER OF A WINDROWER
Filed May 25, 1964                    3 Sheets-Sheet 3
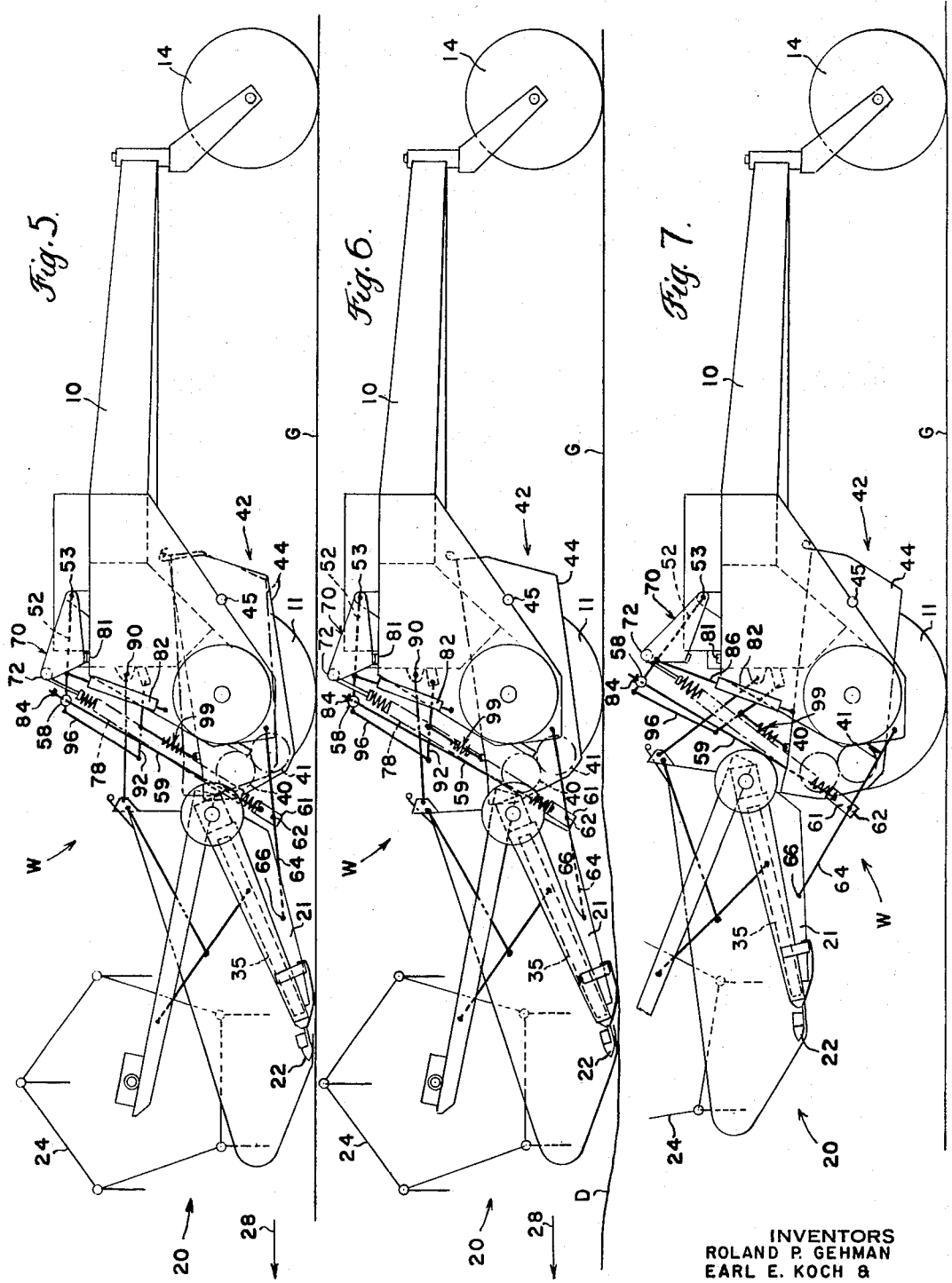
INVENTORS
ROLAND P. GEHMAN
EARL E. KOCH &
HORACE G. MC CARTY
BY Joseph A. Brown
ATTORNEY United States Patent Office 3,293,835
Patented Dec. 27, 1966

3,293,835
LIFT SYSTEM FOR THE HEADER AND CONDITIONER OF A WINDROWER
Roland P. Gehman, Stevens, Earl E. Koch, Mohnton, and Horace G. McCarty, New Holland, Pa., assignors to Sperry Rand Corporation, New Holland, Pa., a corporation of Delaware
Filed May 25, 1964, Ser. No. 369,815
20 Claims. (Cl. 56—23)

This invention relates generally to agricultural machines and more particularly to windrowers operative to cut standing crop material and deposit it in a windrow. Still more specifically, the invention relates to an improved system for supporting and lifting the header and conditioner of a windrower.

A conventional windrower has a header which cuts a swath of material in the range of about ten to sixteen feet wide. A reel sweeps the material to a reciprocating cutter. A pair of endless drapers or auger sections operate to convey the cut material to a center location where the consolidated crop is deposited in a windrow. Conditioning rolls are provided through which the crop passes before it reaches the ground.

Windrow headers are of substantial size and carry many structural components to drive the cutter, operate the drapers or auger sections, and rotate the reel. A strong framework is required to carry such structure and the entire header must be mounted on a tractor unit to be located close to the ground in cutting most crops, elevated from the ground when in transport and located at an intermediate location when working in certain materials.

One object of this invention is to provide a lift system which supports a windrower header by spring means only when the header is in lowered normal operating position and independently of a mechanical lift structure whereby the header is able to "float" and follow the contours of the ground to insure optimum operation.

Another object of this invention is to provide a support and lift system for a windrower header so constructed that one side of the header, or the other side, or both sides, may drop downwardly or raise vertically to follow ground irregularities in the operation of the machine.

Another object of this invention is to provide a lift system for a windrower header whereby the header is stable regardless of whether it is in lowered or elevated position, and when lowered the effective weight at the ground of one end of the header is the same as at the opposite end.

Another object of this invention is to provide a lift system of the character described in which both positive and resilient components are employed in elevating a windrower header.

Another object of this invention is to provide a windrower having a header and a conditioner mounted on a common frame and adapted to be raised and lowered from the same lift system, the conditioner however being adjustable within a limited range independently of the header.

A further object of this invention is to provide a windrower lift system which supports a header horizontally when it is being elevated or lowered.

A still further object of this invention is to provide a windrower header support and lift system which is designed for quick and easy adjustment whereby the operating characteristics of the system may be established as desired.

Other objects of this invention will be apparent hereinafter from the specification and from the recital in the appended claims.

In the drawings:
FIG. 1 is a fragmentary side elevation of a windrower having a support and lift system constructed according to this invention, the header of the machine being in lowered normal operating position;

FIG. 2 is a fragmentary plan view facing forwardly relative to the operation of the machine and showing the left side of the system;

FIG. 3 is a fragmentary section taken on the line 3—3 of FIG. 1 looking in the direction of the arrows and showing the connection employed between one of the lift arms of the system and one of the lower lift legs for elevating the header;

FIG. 4 is a partially diagrammatic plan view showing the header and in particular the stabilizer structure of the support and lift system;

FIG. 5 is a diagrammatic side view on a reduced scale of the windrower with its header in lowered normal operating position as shown in FIG. 1 and with the conditioner shown in solid lines in a normal operating location relative to the header and in dotted lines in an adjusted position;

FIG. 6 is a diagrammatic view similar to FIG. 5 but showing the header below normal operating position and following a depression in the ground while at the same time the conditioner remaining in normal operating position; and FIG. 7 is a view similar to FIGS. 5 and 6 and showing the header and conditioner elevated for road transport.

Referring now to the drawings by numerals of reference, W denotes a windrower machine having a frame structure 10 supported on a pair of laterally spaced ground wheels 11 and 12 and by a rear caster wheel 14. An engine 15 is mounted on a rearward portion of frame 10 and connected by a drive train 16 including chain means 18 to rotate wheels 11 and 12.

Located in front of frame 10 and extending transversely relative thereto is a header 20 having a frame structure 21 which carries a crop gathering means including a reciprocating cutter 22, a sweep reel 24, and a pair of spaced drapers or conveyors 25 and 26, FIG. 4. On the forward travel of frame 10 over the ground G as indicated by the arrow 28, standing crop material is adapted to be cut by the sickle 22 and deposited upon the drapers 25 and 26. The reel 24 sweeps the material over the cutter and facilitates its deposit on the drapers. When viewed as shown in FIG. 4, the upper reach of draper 25 travels to the right and the upper reach of draper 26 travels to the left whereby the cut material is consolidated and deposited in a location 29 along the longitudinal axis of the machine.

The drapers 25 and 26 are driven from engine 15 through a sheave 30. A universal drive linkage 31 is provided from the sheave to draper 25 and a similar linkage 32 extends to draper 26. A wobble drive 34 connected to linkage 32 operates through shaft 35 to reciprocate cutter 22. A chain 36 and belt 38 transmits the driving force from linkage 31 to the reel 24.

The consolidated cut crop material deposited in location 29 between drapers 25 and 26 is immediately picked up and passed between conditioning rolls 40 and 41 of a crop conditioner 42. The conditioner has a frame 44 pivotally mounted at 45 on frame 10 of the machine. When viewed as shown in FIG. 1, roll 40 is rotated counterclockwise and roll 41 clockwise through a drive including a chain 46.

For raising and lowering header 20 and conditioner 42 relative to frame 10 and the ground G, a pair of support structures 50 and 51 are provided. Support structure 50 is located on frame 10 along the left side of the machine facing forwardly and is connected to the left side of header 20 and conditioner 42. The support structure 51 is located adjacent the right side of the machine and is connected to the right side of the header and conditioner. Both structures are of the same construction; therefore, only support 50 will be described.

As shown best in FIGS. 1–3, support 50 has a lift arm 52 which extends in a fore-and-aft direction relative to the travel of the machine. A rearward end 54 of lift arm 52 is pivotally connected at 53 to frame 10 and the arm has a forward end 55 adapted to be moved between a lower position as shown in FIGS. 1 and 5 and an elevated position as shown in FIG. 7. Lift arm 52 comprises a pair of laterally spaced straps 56 interconnected by a guide 58 (FIG. 3) extending transversely and having a vertical hole 57. A vertically extending lift rod 59 passes through hole 57 in the guide for slidable movement relative thereto and the lower end 60 of the rod is affixed to an inverted U-shaped bracket 61 pivotally connected at 62 to a lift leg 64. Lift leg 64 has a rearward end pivotally connected at 65 to the machine frame 10. The leg extends forwardly and is pivotally connected at 66 to the frame 21 of header 20. Upward pivotal movement of leg 64 is limited by a stop bracket 63 affixed to frame 10 in the path of travel of the leg.

Coextensive with lift arm 52 is a rocker 70 comprising a pair of spaced vertically extending plates 71 between which the lift arm is located. The rearward end of rocker 70 is supported on the same pivot 53 as the lift arm. At its forward end 73, the rocker carrier a transverse pin element 72 to which a bracket 74 is pivotally connected. The lower end of bracket 74 has a transverse plate 75 (FIG. 3) to which a pair of tension springs 76 and 78 are attached. The lower ends of the springs are affixed to the U-shaped bracket 61. Rods 79 extend through the springs and are provided with threaded nuts 80 engaging plate 75 whereby the tension of the springs may be varied. When viewed as shown in FIG. 1, downward pivoting movement of the rocker 70 in a counterclockwise direction is limited by a stop 81 on frame 10. When the rocker is against stop 81, header 20 is resiliently supported by springs 76 and 78 and adapted to float relative to the ground.

Connected between frame 10 and lift arm 52 is a hydraulic cylinder 82 having a rod 86 shown retracted in FIG. 1 and extended in FIG. 7. The upper end of lift rod 59 has stop nuts 84 threaded on it and these nuts are normally located spaced above guide 58 when the lift arm is in lowered position. Guide 58 and stop nuts 84 provide a lost-motion connection between lift rod 59 and lift arm 52. A foot pedal 85 is provided on frame 10 and operative through conventional means not shown to control the operation of cylinder 82. When rod 86 of cylinder 82 is moved toward extended position, it forces lift arm 52 to pivot in a clockwise direction. Guide 58 slides along lift rod 59 and is brought into engagement with the nuts 84. Further, the lift arm 52 is brought into engagement with the fixed element 72 on the rocker 70. When nuts 84 and element 72 are engaged both the lift rod and rocker are moved upwardly, FIG. 7. The force transmitted to lift leg 64 through both the lift rod 59 and springs 76 and 78 operates to both positively and resiliently cause the header to be elevated. To drop the header, the cylinder 82 is retracted and the header falls by its own weight.

To keep the header horizontal when it is elevated, a stabilizer bar 90 is pivotally mounted by brackets 91 on frame 10. The opposite ends of the stabilizer bar have levers 92 and 94, respectively, which extend forwardly. Lever 92 is connected by transverse rod 95 to a link 96 one end of which is pivotally connected to rod 95 and the other end to lift arm 52 of support 50. The other lever 94 is similarly connected to the support structure 51.

The drive components to cutter 22 along the left side of header 20 are somewhat heavier than the drive structure to reel 24 along the right side of the header. When the header is elevated, there would be a tendency for the left side to drop below the right side. However, because of the torsional linkage provided by bar 90 between the support structures at opposite sides of the machine, the header is maintained horizontal when it is elevated. Upper spaced parallel lift bars 98 also assist in the lifting operation and in horizontal stability.

The stabilizer levers 92 and 84 provide connections for telescopic spring linkage connections 99 to the forward end to conditioner frame 44. These telescopic spring connections to the conditioner cause the forward end of the conditioner to be raised and lowered through the same support structures that carry header 20.

As shown best in FIGS. 5–7, when header 20 is in lowered operative position, the forward end 55 of lift arm 52 of support structure 50 is in a lowered position. The threaded nuts 84 on lift rod 59 are spaced above guide 58 and the lift rod is free to slide in a vertical direction relative to the guide. When lift arm 52 is in such lowered position, the header is supported from rocker 70 on the pairs of springs 76 and 78. When a depression D in the ground G is encountered as shown in FIG. 6, the header may drop downwardly until the threaded nuts 84 come into engagement with guide 58. In the actual machine, the amount of downward movement of the header below the horizontal ground line G is in the range of about four inches. When an elevation in the ground is encountered, header 20 may "float" upwardly. The cutter 22 is thus able to closely follow the contour of the ground and cup the crop low.

When the header 20 is to be elevated, the hydraulic cylinder 82 is actuated to extend rod 86 and lift arm 52 upwardly. Upon engagement of guide 58 with the nuts 84, the lost-motion connection between the lift arm and lift rod becomes solid and the header is elevated through a positive linkage. When the lift arm engages fixed element 72 on rocker 70, the springs 76 and 78 also operate to lift the header. The lifting of header 20 is thus both mechanical and resilient. At the same time, the stabilizer bar 90 and the levers 92 and 94 maintain the header unit in a horizontal condition. Upon engagement of the lift legs 64 with the stop brackets 63, upward travel of the header ceases and the header is held in a stable elevated condition.

When the header is in lowered operating position, it is desirable to have the weight adjacent the ground at one end of the header substantially the same as at the opposite end. This is easily accomplished by the double springs 76 and 78 of the support structures 50 and 51 and adjustment nuts 80. The spring support at one side of the header is adjustable independently of the opposite side.

It will be also noted in FIG. 5, that by pivoting the lift arms 52 upwardly, the conditioner 42 is immediately pivoted from the solid to the dotted position through resilient links 99 relative to frame 10. However, the header is not lifted through springs 76 and 78 because of the substantial weight of the header. It is lifted by lift rods 59 only upon engagement of the lift arms with nuts 84. Because of the spacing of the nuts 84 from the guides 58, a certain limited adjustment of the conditioner 42 is provided through the support structures and independently of header 20. Thus, it is seen that while the conditioner and header are lifted through common support structures, for a certain limited range of movement the conditioner is adjustable independently of the header. This is highly desirable because it allows the conditioner to be set in optimum operating condition relative to the crop being harvested, even though the header is in lowered operating position.

In the operation of support structures 50 and 51, the hydraulic cylinders 82 do not constitute part of the support system when the rods 86 are fully retracted. They come into operation only when the lift arms 52 are pivoted upwardly and when the arms are brought into engagement with the lift rod nuts 84 and the rocker elements 72. The elimination of the hydraulic cylinders from the support system when the header is down provides much more sensitivity in the operation of the header and its floating action on the support springs 76 and 78. In like respect, when the lift arms 52 are down, the stabilizer system is not linked to the header. As a result, the header may float freely up and down within a limited range. The left side of the header may drop independently of the right side and the right side may drop independently of the left side or both sides may drop together. In this way, all types of ground variations are taken care of and the header 20 closely follows the contours of the ground.

The support and lift system described provides better header operation when the header is down and more stability when the header is elevated. The adjustability of the conditioner independently of the header is a highly desirable feature and such is achieved through the same support structure which carries the header. The design is rugged and of moderate cost, subject to long operation without repair.

While this invention has been described in connection with a particular embodiment thereof, it will be understood that it is capable of modification, and this application is intended to cover any variations, uses, or adaptations following, in general, the principles of the invention and including such departures from the present disclosure as come within known or customary practice in the art to which the invention pertains, and as fall within the scope of the invention or the limits of the appended claims.

Having thus described our invention, what we claim is:

1. An agricultural machine comprising a wheeled frame adapted for ground travel forwardly, a header in front of said frame and extending transversely, said header having crop gathering means thereon, a support structure for raising and lowering said header relative to said frame, said structure comprising a lower lift leg having one end pivotally connected to said frame and an opposite end pivotally connected to said header, a lift arm and a rocker coextensive therewith, means pivotally connecting said lift arm and rocker to said frame, a lift rod having one end connected to said lift leg, lost-motion connection means between an opposite end of said lift rod and said lift arm, spring means connecting said rocker to said lift leg, a stop on said frame limiting pivotal movement of said rocker in one direction, and an element on said rocker with which said lift arm is engageable when pivoted in one direction whereby the rocker may be pivoted with the lift arm.

2. An agricultural machine as recited in claim 1 wherein said lost-motion connection means comprises a stop member adjustably mounted on said lift rod and with which said lift arm is engageable when pivoted in one direction, the connection between said lift arm and lift rod becoming solid after said stop member is engaged.

3. An agricultural machine as recited in claim 1 wherein means is provided for adjusting the tension of said spring means between said lift leg and said rocker.

4. An agricultural machine as recited in claim 3 wherein said spring means comprises a pair of springs coextensive with said lift rod and located at opposite sides thereof, the tension of said springs being independently adjustable.

5. An agricultural machine comprising a wheeled frame adapted for forward ground travel, a header in front of said frame and extending transversely, said header having crop gathering means carried thereon, a pair of laterally spaced support structures on said frame one of which is connected to one side of said header and the other to the opposite side, each support structure comprising a lower lift leg having a rearward end pivotally connected to said frame and a forward end pivotally connected to said header, an upper lift arm having a rearward end pivotally connected to said frame and extending forwardly therefrom to a forward end, power means connected between said frame and said lift arm to pivot said forward end upwardly from a lower operating position to an upper retracted position, a lift rod extending in a vertical direction and having a lower end connected to said lift leg and having an upper end slidable relative to said lift arm when the arm is in said lower position, lost-motion means connecting said lift rod upper end to said lift arm, a rocker coextensive with said lift arm, means pivotally connecting a rearward end of said rocker to said frame, spring means connecting a forward end of said rocker to said lift leg, a stop on said frame with which said rocker is engageable and limiting downward movement of the rocker forward end, a fixed element on said rocker with which said lift arm is engageable, said rocker element being so located relative to the operation of said lift arm that when the lift arm is pivoted upwardly said rocker element is engaged to cause said rocker to lift upwardly with the lift arm and through said spring means to assist in raising said header, the lost-motion connection between the lift arm and said lift rod becoming solid after a given amount of upward movement of the lift arm whereby the header is both resiliently and positively raised.

6. An agricultural machine comprising a wheeled frame adapted for forward ground travel, a header in front of said frame and extending transversely, said header having crop gathering means carried thereon a pair of laterally spaced support structures on opposite sides of said frame one of which is connected to one side of said header and the other to the opposite side, each support structure comprising a lower lift leg having a rearward end pivotally connected to said frame and a forward end pivotally connected to said header, an upper lift arm having a rearward end pivotally connected to said frame and extending forwardly therefrom to a forward end, power means connected between said frame and said lift arm to pivot its forward end upwardly from a lower operating position to an upper retracted position, a lift rod extending in a vertical direction and having a lower end connected to said lift leg and an upper end slidable relative to said lift arm when the arm is in said lower position, a stop on the lift rod upper end above said lift arm engageable therewith when the lift arm is moved toward said upper position, a rocker coextensive with said lift arm, means pivotally connecting a rearward end of said rocker to said frame, means including a spring connecting a forward end to said rocker to said lift leg, a stop on said frame with which said rocker is engageable and limiting downward movement of the rocker forward end, a fixed element on said rocker above said lift arm, the parts of each support structure being so located that when its lift arm is pivoted upwardly from said lower position said lift rod stop is engaged to raise the header through the rod and said rocker element is engaged to raise the header through said spring whereby the header is both positively and resiliently raised.

7. An agricultural machine as recited in claim 6 wherein said frame pivotally carries a transverse torsion bar, a pair of levers, one rigid with one end of said bar and the other with the opposite end, and a pair of links, one link pivotally connecting one of said levers to the lift arm of one of said support structures and the other link pivotally connecting the other of said levers to the lift arm of the other support structure.

8. An agricultural machine as recited in claim 7 wherein a crop conditioner is pivotally connected to said frame to receive material from said header, and means connecting said levers to said conditioner whereby the conditioner is pivoted responsive to pivoting of the link arms of said support structures.

9. An agricultural machine as recited in claim 8 wherein the means connecting said levers to said container is extendible and resilient.

10. An agricultural machine comprising a wheeled frame adapted for forward ground travel, a header in front of said frame and extending transversely, said header having crop gathering means thereon, a pair of support structures on opposite sides of said frame and connected respectively to opposite sides of said header, each support structure comprising a lower lift leg having a rearward end pivotally connected to said frame and a forward end pivotally connected to said header, an upper lift arm having a rearward end pivotally connected to said frame and extending forwardly therefrom to a forward end, power means connected between said frame and said lift arm to pivot the forward end of the arm upwardly from a lower position to an upper position, a lift rod extending in a vertical direction, means connecting a lower end of said lift rod to said lift leg, a guide on said lift arm through which an upper end of said lift rod slidably extends, a stop on said lift rod upper end above said lift arm and engageable with said guide when the lift arm is moved from said lower toward said upper position, a rocker coextensive with said lift arm, means pivotally connecting a rearward end of said rocker to said frame, spring means connecting a forward end of said rocker to said lift leg, a stop on said frame with which said rocker is engageable and limiting downward movement of the rocker forward end, a fixed element on said rocker above said lift arm and engageable by the arm, the parts of each support structure being so located that when its lift arm is in said lower position its rod stop is spaced from the lift arm guide and the header is resiliently supported by the rocker through the spring means, and when the lift arm is pivoted upwardly said guide engages said rod stop and the lift arm engages said rocker fixed element whereby the lift leg is pivoted upwardly and the header is lifted by both said rod and said spring means.

11. An agricultural machine as recited in claim 10 wherein said power means comprises a hydraulic cylinder which when contracted locates said lift arm spaced from said lift rod stop.

12. An agricultural machine as recited in claim 10 wherein said spring means on both support structures is adjustable and one independently of the other whereby the amount of spring support at one side of the header may be different from the support at the opposite side.

13. An agricultural machine as recited in claim 12 wherein the spring means for each support structure comprises a pair of springs between which said lift rod extends, the fixed element on each rocker providing a connection to its associated spring means.

14. An agricultural machine as recited in claim 10 wherein a transverse torsion bar is carried on said frame and linked to each support structure whereby when the header is lifted and each lift arm is in engagement with the stop of its associated lift rod, the header is restrained to extend horizontally.

15. An agricultural machine as recited in claim 10 wherein said stop on the upper end of the lift rod of each support structure comprises a nut threaded on the rod and axially adjustable to vary the point of engagement by the guide on its associated lift arm.

16. An agricultural machine as recited in claim 10 wherein a pair of fore-and-aft bars are pivoted to said frame, one adjacent each supoprt structure and extending therefrom for pivotal connection to said header, said bars being substantially vertically spaced from the lift legs of the support structures.

17. An agricultural machine as recited in claim 10 wherein upward pivotal movement of the lift leg of each support structure is limited by a stop bracket affixed to said frame and with which the lift leg is engageable.

18. An agricultural machine comprising a wheeled frame, a crop gathering header pivotally mounted on said frame, a crop conditioner pivotally mounted on said frame and located to receive material from said header, said header and conditioner being pivotal between lowered operative positions and elevated inoperative positions, a lift arm pivoted at one end to said frame and having an opposite end movable between a lower position and an elevated position, means connected to said lift arm for pivoting it, a first connection between said lift arm and said conditioner, a second connection between said lift arm and said header, said second connection including lost-motion means which first provides a slidable connection with said lift arm when the arm is pivoted from said lower and toward said upper position and then a solid connection, whereby the conditioner may be adjusted by said lift arm independently of the header until said lost-motion means of said second connection becomes solid.

19. An agricultural machine comprising a wheeled frame, a crop gathering header pivotally mounted on said frame, a crop conditioner pivotally mounted on said frame and located to receive material from said header, a lift arm pivoted on said frame for movement between an extended and a retracted position, first means linking said lift arm to said conditioner, a second means linking said lift arm to said header, power means for swinging said link arm between said positions, and said second linking means including a lost-motion connection whereby when said lift arm is pivoted from said extended position to said retracted position said conditioner is first pivoted relative to said frame and after a given pivoting of the conditioner the header is pivoted with it.

20. An agricultural machine comprising a wheeled frame adapted for forward ground travel, a header in front of said frame and extending transversely, said header having crop gathering means thereon, a pair of support structures on opposite sides of said frame and connected respectively to opposite sides of said header, each support structure comprising a lower lift leg having a rearward end pivotally connected to said frame and a forward end pivotally connected to said header, an upper lift arm having a rearward end pivotally connected to said frame and extending forwardly therefrom to a forward end, a hydraulic cylinder connected between said frame and said lift arm to pivot the forward end of the arm upwardly from a lower position to an upper position, a lift rod extending in a vertical direction, means connecting a lower end of said lift rod to said lift leg, a guide on said lift arm through which an upper end of said lift rod slidably extends, a threaded nut stop on said lift rod upper end above said lift arm and engageable with said guide when the lift arm is moved from said lower toward said upper position, a rocker comprising a pair of plates extending in vertical planes and between which said lift arm is located, means pivotally connecting a rearward end of said rocker to said frame, spring means connecting a forward end of said rocker to said lift leg, a stop on said frame with which said rocket is engageable and limiting downward movement of the rocker forward end, a fixed element connecting said pair of plates of said rocker, said fixed element being located above said lift arm and engageable by the arm, the parts of each support structure being such that when its lift arm is in said lower position the rod nut stop is spaced from said lift arm guide and the header is resiliently supported by said rocker through said spring means, and when said guide engages said rod stop and the left arm engages said rocker fixed element whereby the lift arm is pivoted upwardly and the header is lifted by both said rod and said spring means.

References Cited by the Examiner
UNITED STATES PATENTS
2,989,829   6/1961   Heth et al. _____ 56—23

ABRAHAM G. STONE, *Primary Examiner.*
ANTONIO F. GUIDA, *Examiner.*